3,344,067
DERIVATIVES OF COPOLYMERS OF ISOBUTENE AND CONJUGATED DIENES
Cecil G. Brannen, Highland, and James A. Wuellner, Gary, Ind., and Walter C. Edmisten, Olympia Fields, Ill., assignors to Standard Oil Company, Chicago, Ill., a corporation of Indiana
No Drawing. Filed Dec. 28, 1964, Ser. No. 421,679
12 Claims. (Cl. 252—32.7)

This invention relates to novel copolymeric compositions. More particularly, it relates to copolymer compositions having pendant groups suitable for imparting to the copolymer useful properties, and to lubricant compositions containing same.

The increasing complexity of modern engines has resulted in increased requirements for oils used in the lubrication of such engines. Therefore, in formulating lubricating oil compositions for use in modern internal combustion engines, it is necessary to incorporate many various addition agents into the lubricating oil. Among the more important addition agents employed are the viscosity index improvers which function to improve the viscosity-temperature characteristics (viscosity index) of the lubricating oil in which they are employed. Other important addition agents are the detergent or dispersion agents which function to prevent the formation and accumulation of sludge and varnish-like coatings on pistons and cylinder walls of the engine. Normally, corrosion inhibitors which prevent bearing corrosion, oxidation inhibitors which inhibit the oxidative deterioration of the lubricating oil, and rust inhibitors which inhibit rusting of various engine parts, are also incorporated into engine lubricating oils. Oiliness agents are also important to modern lubricating oils to allow the oil to work into the low clearances between bearings created as a result of increased compression ratios in modern internal combustion engines. Because of the requirements of modern engines that so many different types of addition agents, each having a specific function, be included in the lubricating oil, workers in the engine lubricating oil art have in recent years turned to multi-functional addition agents, i.e. addition agents which act to accomplish more than one addition agent function.

It is well known that copolymers produced by conventional polymerization techniques contain monomeric units which alternate regularly or at random in the copolymer chain. The properties of the copolymer will depend upon the particular monomers employed, and the relative concentrations of each monomer in the copolymer product. Thus, by judiciously selecting the monomers to be copolymerized, and by controlling their relative concentrations, copolymers having specific useful properties may be tailor-made to fit the needs of industry. In particular, copolymeric compositions useful as lubricants and lubricant additives may be manufactured.

Lubricating oils perform more effectively when chemical additives are combined with the lubricating oil. Among the more important properties of a lubricant ameliorated by additives, such as polymers and copolymers, is the viscosity index. An improved viscosity index results in a more uniform viscosity at the varying temperatures to which a lubricant is often subjected during use. Thus, a particularly advantageous means of improving the viscosity index of a lubricant is by adding to a base lubricant an oil-soluble copolymer, such as the copolymeric compositions of the present invention.

In recent years lubricant manufacturers have directed their efforts toward multi-purpose lubricant compositions. A composition which performs multi-functions, such as improving the viscosity index, imparting detergency and dispersancy characteristics and rust inhibition reduces the number of additives required in a lubricant, and often proportionately reduces the cost without sacrificing quality.

In accordance with this invention a new class of copolymeric compositions is provided which are useful as multi-functional addition agents for lubricating oils to impart viscosity index improvement, detergency, dispersancy, and anti-wear properties thereto. The copolymeric compositions of this invention consist essentially of units (A) having the formula

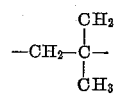

and (B) having the formula

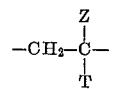

wherein Z is a member of the group consisting of hydrogen and methyl. When Z is hydrogen T is a radical selected from the group consisting of (a) 

(b) 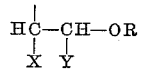

and (c) 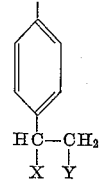

when Z is methyl, T is radical (a) above; X is a member of the group consisting of hydrogen and —SR wherein R is $C_{1-20}$ alkyl; Y is a member of the group consisting of —OH, —SR wherein R is a member of the group consisting of hydrogen and $C_{1-20}$ alkyl, $$-CH_2-CH-C(O)O-CH_2CH_2-N-CH_3 \quad \text{and} \quad -S-C-S-C-SR_2$$
$$\phantom{-CH_2-}CH_3 \phantom{-C(O)O-CH_2CH_2-}CH_3 \phantom{\text{and} \quad -S-}N\phantom{-S-C-}N$$

wherein $R_2$ is a member of the group consisting of hydrogen and $C_{1-20}$ alkyl, wherein the molar ratio of A:B is 1–100:1.

The above described compositions are prepared by first copolymerizing (A) isobutene (2-methylpropene) with (B) polymerizable monomers of the group consisting of butadiene, butadienyl $C_{1-20}$ alkyl ether, isoprene, and divinyl benzene to form a copolymer with pendant vinyl groups which copolymer is then separated from the reaction mixture. Active substituents are then introduced into the copolymer by reaction with the pendant vinyl groups to form the novel multi-functional lubricant additives of this invention. The molar ratio of monomers A:B is from 1–100:1, preferably 5–50:1, to form the corresponding copolymers consisting of polymerized units A and B as set forth above. Suitable oil-soluble copolymers are obtained when the molecular weight is at least 1000.

Polymerization techniques for polymerizing monomers A and B are known in the art. Cationic polymerization techniques employing a Lewis acid are preferred. Ziegler-type catalysts may also be advantageously employed. Typical Lewis acid catalysts suitable for copolymerizing copolymers of the present invention are boron trifluoride, $BF_3$ etherate, aluminum chloride, titanium chloride. An example of a suitable Ziegler catalyst is trialkyl aluminum and titanium chloride. From about 1 to 20 weight percent of the catalyst may be used in the polymerization.

The copolymerization is carried out at a temperature in the range of from about 0 to about −100° F. and preferably from about −20 to about −60° F. The polymerization may be effected in bulk or solution, and a preferred method is solution polymerization. A typical solvent is heptane; however, most inert hydrocarbon solvents are suitable. After completion of the reaction, the copolymer is then recovered by precipitation in a non-solvent such as methanol and is then advantageously redissolved in a solvent such as n-hexane and reprecipitated in non-solvent to produce a relatively pure backbone copolymer having pendant vinyl groups. Suitable non-solvents are low molecular weight alcohols such as methanol, ethanol, butanol, isopropanol, and the like. Suitable solvents are pentane, hexane, heptane, benzene, toluene, xylene, and the like. Further purification may be accomplished by successive precipitation with non-solvent and redissolving with solvent.

The active substituent groups introduced into the aforesaid copolymer at the pendant vinyl sites are provided by dialkyl disulfides of the formula R—S—S—R wherein R is $C_{1-20}$ alkyl; dimethylaminoethylmethacrylate,

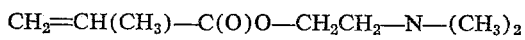

and a dimercaptothiadiazole of the formula

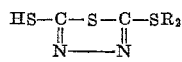

wherein $R_2$ is hydrogen or $C_{1-20}$ alkyl. Reaction of the copolymer with at least a molar amount of the aforesaid reactants equivalent to the molar proportion of copolymerizable monomer B under free radical conditions forms the copolymer of the invention. The reaction is preferably conducted in the presence of a free radical initiator or catalyst at temperatures in the range of from about 30 to about 200° C. and preferably from about 60 to 150° C. Catalysts useful in the reaction are those catalysts that initiate reaction by free radical mechanism. The preferred catalysts are benzoyl peroxide and azobisisobutyronitrile. Other useful catalysts are t-butyl peroxide, t-butylhydroperoxide, ozone, ozonides, barium peroxide, sodium peroxide, acetyl peroxide, lauryl peroxide, stearyl peroxide, acetone peroxide, triacetone peroxide, diethyl peroxide, etc., and their mixtures. The free radical catalysts may be used advantageously in amounts of from about 0.1 to about 10 weight percent based on the active substituent monomer and preferably in amounts of from about 0.5 to about 3.0 weight percent. Hydration of the pendant vinyl groups can be effected by hydroboration of the copolymer to introduce free hydroxyl groups into the composition.

The pendant vinyl groups of the backbone copolymers permit the addition of active substituents to the backbone to form an addition agent which affords a lubricating oil other properties besides the viscosity index improvement of the copolymer alone. In accordance with this invention the properties desired in the additive are pre-determined and a preselected monomer having substituents which afford the predetermined properties is grafted to the backbone. As a typical example, where it is desired to obtain a viscosity improving addition agent which also has detergency and dispersancy properties, isobutene is copolymerized with butadiene, molar ratio of 25:1, in heptane solvent in the presence of a catalytic amount of Ziegler catalyst (triethyl aluminum and $TiCl_4$) at −20° F. The reaction mixture is then filtered to remove catalyst and any filterable impurities and the reaction product copolymer is precipitated from the filtrate by precipitation in methanol. The copolymer is dissolved in mixed xylene solvent and 4 moles of dimethylaminoethylmethacrylate are added along with tert-butyl peroxide as catalyst. The mixture is heated with refluxing at 135–140° C. for 24 hours. The resulting graft polymer is recovered by precipitation in methanol.

A viscosity index improving copolymer having detergency and dispersancy properties is prepared by copolymerizing a mixture of isobutene and butadiene, in a molar ratio of about 50:1, in heptane at about −40° C. using $BF_3$ as the catalyst. The separated copolymer is then dissolved in hexane and reacted with dibutyl disulfide in the presence of about 3 percent benzoyl peroxide as the catalyst at 60° C. for about 2 hours.

The addition of dimercaptothiadiazole to a copolymer of isobutene and divinylbenzene in a molar ratio of 10:1 is effected by heating a solution thereof in heptane at about 90° C. for a period of 10 hours. The substituted copolymer is an effective multi-functional viscosity improvement agent.

An oil-soluble copolymer of isobutene and butadienyl methyl ether having molar ratio of 25:1 respectively and a molecular weight in the range of 60,000 to 70,000 is dissolved in heptane and reacted with dimethylaminoethylmethacrylate in the presence of azobisisobutyronitrile as the catalyst at a temperature of 90–100° C. The resultant graft copolymer is a highly effective detergent, carbon dispersant, and viscosity index improving lubricating oil additive.

A hydroxyl containing copolymer of isobutene and isoprene, molar ratio of 30:1, is prepared by dissolving about 50 g. of polymer in 50 ml. of heptane, 100 ml. of diglyme and 1.14 g. of sodium borohydride. To the stirred solution at room temperature is added dropwise 5.68 g. of $BF_3$ etherate dissolved in 25 ml. diglyme over a 30 minute period. After the mixture has stirred for one hour, about 30 ml. of 20 percent aqueous sodium hydroxide and 30 ml. of 30 percent hydrogen peroxide are added and mixture refluxed for 2 hours. The hydrated polymer is extracted with hexane and isolated by pouring the hexane solution into a large excess of methanol. The resulting product shows the presence of hydroxyl groups by absorption at $3\mu$ in its infrared spectrum.

Multi-grade motor lubricating oil basestocks can be formed by the addition to suitable mineral oil basestocks of from 0.1 to about 20 weight percent of oil-soluble copolymers of this invention having molecular weights in the range of 2000 to 200,000, the amount dependent upon the polymer molecular weight and the viscosity of the oil base used. The preferred range, for good shear stability in an SAE 10W–30 grade motor oil, is about 1 to 10 weight percent of a product of molecular weight from about 5000 to about 100,000 and preferably 50,000 to 90,000 and containing a molar ratio of A:B units of about 20–50:1.

The addition of about 2 weight percent of a polymer having a molar ratio of units A:B of about 25:1 and a molecular weight of from about 60,000 to about 70,000 to a 50/50 blend of solvent extracted SAE 5 and SAE 10 grade mineral lubricating oil basestocks will produce a SAE 10W–30 grade motor oil basestock suitable for the preparation of compounded motor oils. The addition of about 6 weight percent of a barium-containing polybutene-$P_2S_5$ reaction product, about 1 weight percent of zinc dialkyldithiophosphate, and 1 weight percent of calcium petroleum sulfonate to the aforesaid 10W–30 mineral oil basestock forms a satisfactory SAE 10W–30 grade crankcase motor oil.

We claim:
1. The copolymer consisting essentially of units (A) having the formula

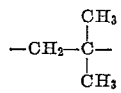

and (B) having the formula

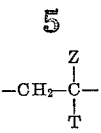

wherein Z is hydrogen or methyl; when Z is hydrogen: T is a radical of the group consisting of (a) 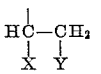

(b) 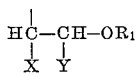

where $R_1$ is $C_{1-20}$ alkyl and (c) 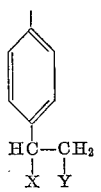

when Z is methyl: T is radical (a) above; wherein X of radical T is hydrogen or —SR where R is $C_{1-20}$ alkyl; Y of radical T is a member of the group consisting of —OH, —SR where R is hydrogen or $C_{1-20}$ alkyl,

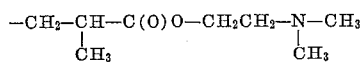

and

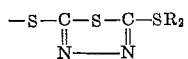

where $R_2$ is hydrogen or $C_{1-20}$ alkyl; and the molar ratio of A:B is 1–100:1.

2. A copolymer of claim 1 having a molecular weight of at least 1000.

3. The copolymer of claim 1 wherein Z is methyl, T is radical (a), X is hydrogen, and Y is —OH.

4. The copolymer of claim 1 where Z is hydrogen, T is radical (a) and X and Y are each —$SC_4H_9$.

5. The copolymer of claim 1 wherein Z is hydrogen, T is radical (a), X is hydrogen, and Y is

—$CH_2$—$CH(CH_3)$—$C(O)O$—$CH_2CH_2$—N—$(CH_3)_2$

6. The copolymer of claim 1 wherein Z is hydrogen, T is radical (b) where $R_1$ is methyl, X is hydrogen, and Y is

—$CH_2$—$CH(CH_3)$—$C(O)O$—$CH_2CH_2$—N—$(CH_3)_2$

7. The copolymer of claim 1 wherein Z is hydrogen, T is radical (c), X is hydrogen, and Y is

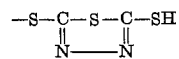

8. A lubricating oil containing a minor amount, sufficient to improve the viscosity index of said oil, of an oil-soluble copolymer of claim 1.

9. The composition of claim 8 wherein the amount of said copolymer is from about 0.1 to about 20 weight percent.

10. A lubricating oil containing from about 0.1 to about 20 weight percent of an oil-soluble copolymer of claim 1 wherein the molar ratio of A:B is 5–50:1, said copolymer having a molecular weight of from about 2,000 to about 200,000.

11. A mineral lubricating oil containing about 2 weight percent of an oil-soluble copolymer of claim 1 wherein the molar ratio of A:B is about 5–50:1, said copolymer having a molecular weight from about 50,000 to about 90,000.

12. The composition of claim 11 further including about 6 weight percent barium-containing $P_2S_5$-polybutene reaction product, about 1 weight percent zinc dialkyldithiophosphate, and about 1 weight percent calcium petroleum sulfonate.

References Cited

UNITED STATES PATENTS

| | | | |
|---|---|---|---|
| 2,142,980 | 1/1939 | Huijser et al. | 260—85.3 |
| 2,892,788 | 6/1959 | Stewart et al. | 252—48.6 |
| 2,901,458 | 8/1959 | Banes et al. | 260—85.3 |
| 2,956,018 | 10/1960 | Carlyle et al. | 252—32.7 |
| 2,962,472 | 11/1960 | Stuart | 260—85.3 |

DANIEL E. WYMAN, *Primary Examiner.*

L. G. XIARHOS, *Assistant Examiner.*

UNITED STATES PATENT OFFICE
CERTIFICATE OF CORRECTION

Patent No. 3,344,067                            September 26, 1967

Cecil G. Brannen et al.

It is hereby certified that error appears in the above numbered patent requiring correction and that the said Letters Patent should read as corrected below.

Column 2, lines 11 to 13, the formula should appear as shown below instead of as in the patent:

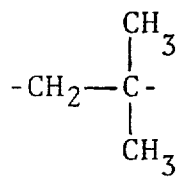

Signed and sealed this 5th day of November 1968.

(SEAL)
Attest:

Edward M. Fletcher, Jr.                       EDWARD J. BRENNER
Attesting Officer                              Commissioner of Patents